United States Patent [19]

Abraham et al.

[11] 4,002,729

[45] Jan. 11, 1977

[54] METHOD FOR THERMOCHEMICAL DECOMPOSITION OF WATER

[75] Inventors: Bernard M. Abraham, Oak Park; Felix Schreiner, Mokena, both of Ill.

[73] Assignee: The United States of America as represented by the United States Energy Research and Development Administration, Washington, D.C.

[22] Filed: Apr. 6, 1976

[21] Appl. No.: 674,199

[52] U.S. Cl. .............................. 423/579; 423/356; 423/424; 423/648; 423/657
[51] Int. Cl.$^2$ ...................... C01B 13/02; C01B 1/02
[58] Field of Search .......... 423/579, 648, 657, 424, 423/356, 470, 491

[56] References Cited

UNITED STATES PATENTS

| | | | |
|---|---|---|---|
| 2,013,977 | 9/1935 | Weiss | 423/424 |
| 3,594,124 | 7/1971 | De Beni | 423/648 |
| 3,839,550 | 10/1974 | Wentorf | 423/579 |
| 3,929,980 | 12/1975 | Abraham et al. | 423/648 |
| 3,969,493 | 7/1976 | Fujii et al. | 423/579 |

FOREIGN PATENTS OR APPLICATIONS 2,206,283   8/1973   Germany ........................... 423/579

OTHER PUBLICATIONS

"Hydrogen Sought Via Thermochemical Methods" Chemical and Engineering News, Sept. 3, 1973, pp. 32–33.

*Primary Examiner*—Edward J. Meros
*Attorney, Agent, or Firm*—Dean E. Carlson; Arthur A. Churm; James W. Weinberger

[57] ABSTRACT

Water is thermochemically decomposed to produce hydrogen by the following sequence of reactions: KI, $NH_3$, $CO_2$ and water in an organic solvent such as ethyl or propyl alcohol are reacted to produce $KHCO_3$ and $NH_4I$. The $KHCO_3$ is thermally decomposed to $K_2CO_3$, $H_2O$ and $CO_2$, while the $NH_4I$ is reacted with Hg to produce $HgI_2$, $NH_3$ and $H_2$. The $K_2CO_3$ obtained by calcining $KHCO_3$ is then reacted with $HgI_2$ to produce Hg, KI, CO and $O_2$. All products of the reaction are recycled except hydrogen and oxygen.

7 Claims, No Drawings

METHOD FOR THERMOCHEMICAL DECOMPOSITION OF WATER

CONTRACTUAL ORIGIN OF THE INVENTION

The invention described herein was made in the course of, or under, a contract with the U.S. ENERGY RESEARCH AND DEVELOPMENT ADMINISTRATION.

BACKGROUND OF THE INVENTION

This invention relates to a method of producing hydrogen. In more detail, the invention relates to the thermochemical decomposition of water to produce hydrogen.

An assured long-term supply of inexpensive energy is essential for maintenance and growth of a modern industrial society. It has been suggested — see, for example, pages 13–21 of Scientific American for January 1973 — that hydrogen is an excellent choice as a general fuel or energy carrier because it is nonpolluting and can be produced from energy sources other than fossil fuel. Hydrogen can be burned to develop thermal energy or used in a fuel cell to develop electrical energy. However, if hydrogen is to become fuel of the future, new procedures for producing it economically in large quantities will have to be developed.

Presently hydrogen is produced by cracking natural hydrocarbons, by reacting coal with water or by the electrolysis of water. It is only by decomposing water using energy obtained from a nonfossil-fueled source such as nuclear or solar energy that depletion of fossil fuel reserves can be avoided.

To electrolyze water, primary energy in the form of heat — nuclear, geothermal or solar — or hydrostatic head must be converted into electrical energy. Such processes are inherently inefficient and, in addition, require a large capital investment which adversely affects the cost of the final product. Apart from cost, there is the problem of the availability of electrical power. To replace the thermal equivalent of all the fossil fuel currently consumed in the United States by electrolytic hydrogen would require at least a fifteen-fold increase in the present electrical generating capacity and, if only nuclear powered capacity is admitted, at least 150-fold increase. Clearly, an alternate to processes currently in commercial use must be developed if hydrogen is to become the energy carrier of the future.

A thermochemical process not requiring conversion of primary heat into electricity would be ideally suited for the purpose provided the temperatures of operation were sufficiently low that available sources of heat could be used. It has been shown that a single-stage thermochemical process for the production of hydrogen is not possible below 2227° K. Several of these processes are described in De Beni and Marchetti, *Proceedings of the Symposium on Nonfossil Chemical Fuels*, Boston Mass., April 10–14, 1972, pages 100–133. All of these processes require temperatures higher than those available from presently operating nuclear reactors and geothermal sources. A thermochemical process utilizing lower temperatures was disclosed in U.S. Pat. No 3,929,980 and assigned to the common assignee. However, the reaction ratios in that process are slow and the process disclosed therein is not economically feasible.

SUMMARY OF THE INVENTION

According to the present invention, a series of steps is carried out for thermochemically decomposing water by reacting KI, $NH_3$, $CO_2$ and $H_2O$ at ambient temperature to form $KHCO_3$ and $NH_4I$, which are then recovered from the water and separated from each other, decomposing the $KHCO_3$ to $K_2CO_3$, $H_2O$ and $CO_2$, reacting the $NH_4I$ with vaporous metallic mercury to form $HgI_2$, $NH_3$ and $H_2$ and reacting the vaporous $HgI_2$ just formed with the $K_2CO_3$ formed in the previous reaction to produce Hg, KI, $CO_2$ and $O_2$. All of the compounds produced in the series of reactions except hydrogen and oxygen are recycled so that the net effect of the overall process is the decomposition of water.

It is therefore one object of the invention to provide a method for the thermochemical decomposition of water.

It is other object of the invention to provide a method for the thermochemical decomposition of water which requires temperatures which are easily attainable from readily available sources.

DESCRIPTION OF THE PREFERRED EMBODIMENT

In general, the invention employs the following sequence of reactions of decomposing water into its elements at temperatures not exceeding 900° K:

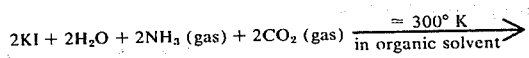

 (1)

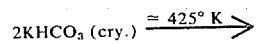

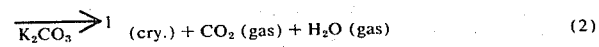 (2)

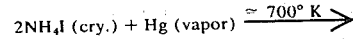

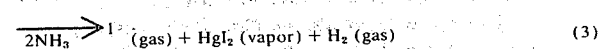 (3)

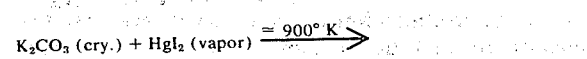

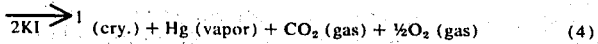

$$\overline{2KI} \xrightarrow{1} (cry.) + Hg \text{ (vapor)} + CO_2 \text{ (gas)} + \tfrac{1}{2}O_2 \text{ (gas)} \qquad (4)$$

In the first step of the sequence, for the conversion of KI, $NH_3$, CO and water into $KHCO_3$ and $NH_4I$, both the $KHCO_3$ and $NH_4I$ are extremely soluble in aqueous solutions, so that is it difficult to use water alone for the solvent and attain any degree of recovery and separation. However, a mixture of an organic compound in water has been found to provide a satisfactory solvent medium. The organic compound must be one which is miscible in water and in which $KHCO_3$ is insoluble, such as acetone or the $C_1$ to $C_3$ alcohols. The compound must be present in such concentration that there is sufficient water for the reaction, but insufficient to solubilize the $KHCO_3$. Good results have been attained using an 87.5% isopropanol solution as a solvent medium. It is preferable that the atmosphere above the mixtures be pressurized to about 25 to 100 psi, preferably about 50 to 75 psi, with either mixtures of ammonia and carbon dioxide or with carbon dioxide alone in order to improve the conversion efficiency. Recommended temperature of operation for this reaction is ambient with a range of 0°–100° C. being operative.

The separation of the products of reaction (1) was studied using a variety of solvent mixtures under varying pressures by placing 56 millimolecules of $NH_4HCO_3$ and 56 millimolecules of KI in a round-bottomed flask and adding 40 milliliters of the solvent mixture. The flask was fastened to a pressure gage and a source of $CO_2$. The flask was flushed to eliminate the air, pressurized if necessary, and heated slowly to about 100° C. As the temperature increased, $KHCO_3$ condensed in the cooler areas of the neck of the flask. After 40 minutes when maximum temperature was attained, the flask was cooled and the contents removed, separated and analyzed. Samples from the saturated solution were taken after equilibration and cooling to ambient temperature and analyzed chemically. The results are shown in Table I below.

$NH_4I$ can be easily recovered from the solution by evaporation or other well-known methods. Although separation efficiency of the reaction is comparatively low which will necessitate the recycling of relatively large volumes of solution, the separation process has been proven.

The $KHCO_3$ which sublimes out on the vessel wall is recovered and subsequently calcined at from about 125° to 200° C. according to reaction (2). No experimental tests have been run of this reaction since it is a straightforward method for analytical chemistry.

The third step of the process involves the reaction of vaporous mercury metal with crystalline ammonium iodide at about 700° K. In effect, the reaction constitutes the iodination of mercury with the consequent release of ammonia and hydrogen.

This reaction was found to proceed in accordance with the equations by enclosing known quantities of ammonium iodide and mercury in a cylindrical reaction vessel made of fused silica. The vessel had a diameter of about 50 millimeters and a volume of approximately 300 cubic centimeters. It was loaded with the reactants, sealed under vacuum, then placed in a furnace and heated to the experimental temperature. After an equilibrium time of up to 1 hour, the vessel was removed from the furnace and cooled quickly. The analysis showed the gases to have the composition expected from the equation and no evidence for the decomposition of ammonia was found. The results of two different temperatures are shown in Table II below.

TABLE II

| Temperature K | Initial charge nmol | | Amount $H_2$ recovered nmol | Kp experimental | Kp calculated |
| --- | --- | --- | --- | --- | --- |
| | $NH_4I$ | Hg | | | |
| 731 | 3.26 | 4.49 | 1.59 | 1011 | 936 |
| 783 | 2.90 | 5.28 | 1.39 | 216 | 225 |

Thus the reaction has been found to be straightforward and to proceed according to the equation without encumbrance with side equations that lower product yields.

In the fourth step, $K_2CO_3$ and $HgI_2$ are heated together at a high temperature of about 900° K in order

TABLE I

| Solvent | Gas Atmosphere | Cation ratio $NH_4^+/KI$ | Anion ratio $I^-/HCO_3^-$ | Concentration of solute mol/100 g solvent |
| --- | --- | --- | --- | --- |
| $H_2O$ | air, 1 atm | 1.1 | 3.5 | 7.6 |
| $H_2O$ | air, 1 atm | 1.1 | 1.8 | 8.5 |
| Ethanol-$H_2O$ 3:1 | $NH_3 + CO_2$, 3.7 atm | 1.7 | 11.7 | 1.8 |
| Ethanol-$H_2O$ 7:1 | $CO_2$, 3.9 atm | 0.7 | 25.0 | 1.0 |
| Isopropanol-$H_2O$ 3:1 | $CO_2$, 4.9 atm | 2.1 | 11.8 | 1.8 |
| Isopropanol-$H_2O$ 7:1 | $CO_2$, 4.4 atm | 3.4 | 13.9 | 0.7 |

As can be seen from Table I, the best results were obtained using an isopropanol to water ratio of about 7:1 at about 5 atmospheres pressure. The salt composition in the solution after equilibration corresponds to a mixture of 77% ammonium iodide, 16% potassium iodide and 7% potassium hydrogen carbonate. The to recover the starting products KI, Hg and $CO_2$ for recycle and to recover the oxygen from the disassociation of the water molecule.

Measurements of equilibration constants were also carried out for reaction (4) by placing a mixture of 2.2 millimoles of HgI and 7.24 millimoles of $K_2CO_3$ in a magnesia crucible reaction vessel. The mixture was found to evolve 1.08 millimoles of oxygen at 899° K which corresponds to a 98% reaction.

All reactions can be carried out under conditions under which reasonable rapid rates are obtained and the yields of the high-temperature reactions are essentially 100%. The highest temperature required is 900° K. The chemistry of the reaction follows the equations 1–4 and there are no harmful side reactions. In particular, no decomposition of any of the ammonia was observed with reaction (3). With respect to yields, reaction (1) is the least attractive and, since the overall solubility is not very high in the isopropanol mixture, appreciable volumes of solutions have to be cycled during the process. However, the solution need never be handled at very high temperatures and waste heat from extraneous sources might be used to make up losses that cannot be recovered by a system of heat exchangers.

Thus, it has been proven that the sequence of reactions produces hydrogen and oxygen at reasonable yield. It can be appreciated that the recommended conditions of operation given are those presently believed to yield the best results. However, optimum conditions of operation have not yet been established. In addition, to obtain reasonable yields in the overall process, it will be necessary to recycle the unreacted materials in some of the stages of the process and to employ repeated passes in others. Such techniques are conventional in the art.

The embodiments of the invention in which an exclusive property or privilege is claimed are defined as follows:

1. A method for decomposing water chemically comprising: (a) reacting KI, $NH_3$, $CO_2$ and $H_2O$ to form $KHCO_3$ and $NH_4I$, (b) separating the $KHCO_3$ and $NH_4I_2$ from the $H_2O$ and from each other, (c) decomposing the $KHCO_3$ to $K_2CO_3$, $H_2O$ and $CO_2$, (d) reacting the $NH_4I$ with vaporous metallic mercury to form $HgI_2$, $NH_3$ and hydrogen, (e) reacting the vaporous $HgI_2$ just formed with the $K_2CO_3$ formed in the previous reaction to produce Hg, KI, $CO_2$ and ½ $O_2$ and recycling all compounds produced in this series of reactions except hydrogen and oxygen, the net effect of the total process thus comprising the decomposition of water.

2. The method for decomposing water chemically according to claim 1 wherein the water present in reaction (a) is mixed with a water-miscible organic compound in which $KHCO_3$ is insoluble.

3. The method of claim 2 wherein the organic compound is selected from the group consisting of acetone and alcohols containing 1 to 3 carbon atoms.

4. The method of claim 3 wherein reaction (a) takes place under a gas pressure of 25 to 100 psig.

5. The method of claim 4 wherein the gas is selected from the group consisting of $CO_2$ and mixtures of $CO_2$ and $NH_3$.

6. The method of claim 5 wherein the water-miscible organic compound is isopropanol and the isopropanol to water ratio is 7:1.

7. A method for decomposing water chemically according to claim 1 wherein the series of reactions employed follows:

$$2KI + 2NH_3 + 2CO_2 + 2H_2O \rightarrow 2KHCO_3 + 2NH_4I$$

$$2KHCO_3 \rightarrow K_2CO_3 + CO_2 + H_2O$$

$$2NH_4I + Hg \rightarrow H_2 + 2NH_3 + HgI_2$$

$$K_2CO_3 + HgI_2 \rightarrow 2KI + Hg + CO_2 + \tfrac{1}{2} O_2.$$

* * * * *